BINARY-CODED DECIMAL ADDER WITH RADIX CORRECTION

Filed March 1, 1965 5 Sheets-Sheet 1

INVENTORS
Pier Giorgio Perotto
Giovanni De Sandre
BY
Shoemaker and Mattare
ATTYS.

INVENTORS
Pier Giorgio Perotto
BY
Giovanni De Sandre
Shoemaker and Mattare
ATTYS.

BINARY-CODED DECIMAL ADDER WITH RADIX CORRECTION

Filed March 1, 1965

INVENTORS
Pier Giorgio Perotto
Giovanni De Sandre
BY
Shoemaker and Mattare
Attys.

BINARY-CODED DECIMAL ADDER WITH RADIX CORRECTION

INVENTORS
Pier Giorgio Perotto
BY
Giovanni De Sandre
Shoemaker and Mattare
ATTYS.

INVENTORS
Pier Giorgio Perotto
Giovanni De Sandre
BY
Shoemaker and Mattare
Attys.

United States Patent Office 3,304,418
Patented Feb. 14, 1967

3,304,418
BINARY-CODED DECIMAL ADDER WITH RADIX CORRECTION

Pier Giorgio Perotto, Turin, and Giovanni De Sandre, Sacile, Italy, assignors to Ing. C. Olivetti & C., S.p.A., Ivrea, Italy, a corporation of Italy
Filed Mar. 1, 1965, Ser. No. 435,813
Claims priority, application Italy, Mar. 2, 1964, 4,933/64
2 Claims. (Cl. 235—169)

The present invention relates to methods and apparatus for performing arithmetic operations in electronic digital computers, and more particularly in computers using a mixed-radix representation of the numbers to be operated upon.

By adding together two mixed-radix numbers, for instance two binary-coded decimal numbers, an uncorrected result is normally obtained, since some digits of the result may be greater than nine and therefore have no meaning in the binary-decimal code, whereby a radix correction from the binary code to the binary-decimal code is necessary. It is well known in the art that said correction may be performed by adding certain filler digits to the uncorrected result digits.

In the known computers said radix correction is performed either by using more than one adder, what implies an increase in the equipment complexity, or by inserting, after each digit period allotted to the addition of a pair of corresponding digits an additional digit period allotted to the correction thereof. In a computer provided with a cyclic memory, the latter provision entails doubling the register length and doubling tthe memory cycle. Furthermore, it is to be noted that the increase in the duration required for the memory cycles spent in the addition, applies also to the other memory cycles which otherwise could be made shorter. Therefore, there is an increase in the ultimate operation times and in the dimensions of the memory.

The aforesaid disadvantages are obviated by the method and the apparatus according to the present invention. According to the invention, a method of adding together two multi-digit binary-coded decimal numbers stored in a cyclic serial memory is characterized in that during a first memory cycle are the successive pairs of corresponding digits of said two numbers are added together, the successive uncorrected sum digits so obtained being stored in said memory, a mark being associated with each uncorrected sum digit to indicate a radix correction to be performed thereupon, and that during a second memory cycle said correction is performed upon all said uncorrected sum digits under the control of the associated marks.

It is apparent that such method allows a single adder to be used both for producing the uncorrected sum and for correcting said sum while using memory registers wherein the successive decimal digits are stored in contiguous digit periods without any special correction period interposed therebetween.

Moreover, when subtracting a number M from a number N, it is necessary to determine whether the number N is greater than the number M or not, in order to decide what kind of radix correction must be performed (that is, what filler digit must be added) on the digits of the uncorrected result. In the aforesaid known adding devices said determination should be made before the memory cycle in which the uncorrected result is produced. This would entail an increase in operation time and circuit complexity. These disadvantages are obviated by the adding device according to an embodiment of the invention.

These and other features and objects of the present invention will be apparent from the following description, made by way of example and not in a limiting sense, in connection with the accompanying drawings, wherein:

FIGS. 1*a* and 1*b* show a block diagram of the circuits of the computer according to an embodiment of the invention;

Figure 7:
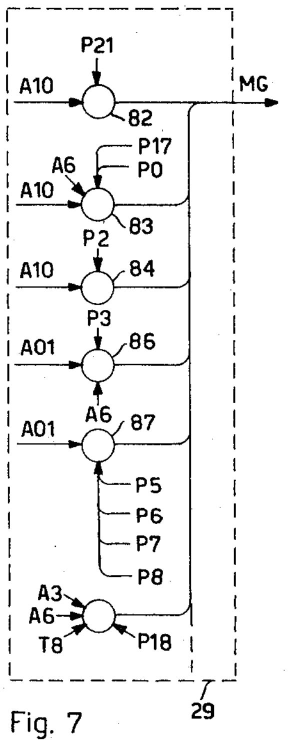
Figure 2:
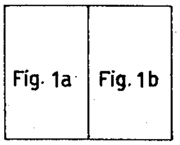
FIG. 2 shows how
Figure 8A:
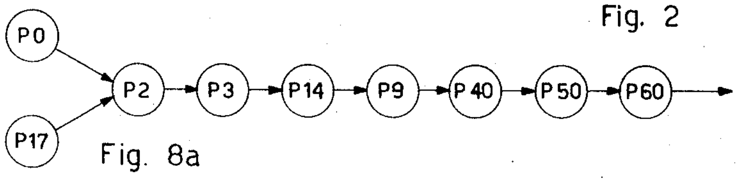
Figure 8B:
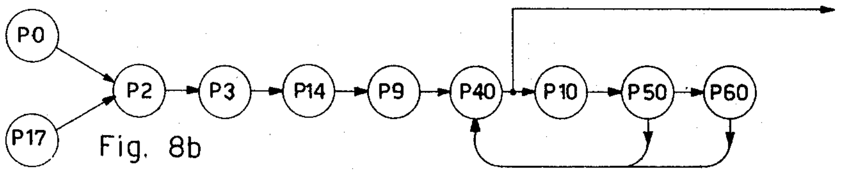

FIG. 7 partially shows a circuit for timing the switching from a status to the next following status in the computer according to the invention;

FIGS. 8*a* and 8*b* are diagrams showing some sequences of statuses of the computer according to an embodiment of the invention.

*General decription*

The computer comprises a storage made of a magnetostrictive delay line LDR including for instance ten registers I, J, M, N, R, Q, U, Z, D, E and provided with a reading transducer 38 feeding a reading amplifier 39 and with a writing transducer 40 fed by a writing amplifier 41.

Each memory register comprises for instance 22 decimal denominations, each one comprising eight binary denominations, whereby each register may store up to 22 eight-bit characters. Both the characters and the bits are processed in series. Therefore a train of 10·8·22 binary signals recirculates in the delay line LDR.

The ten first occurring binary signals represent the first bit of the first decimal denomination of the register R, N, M, J, I, Q, U, Z, D and E respectively, the ten next following binary signals represent the second bit of said first decimal denomination of said registers respectively, etc.

Assuming for instance said binary signals are recorded in the delay line so as to be spaced 1 microsecond from each other, the signals belonging to a certain register will be spaced 10 microseconds from each other. Otherwise stated, each register comprises a train of 8·22 binary signals spaced 10 microseconds from each other, the trains belonging to the several registers being displaced 1 microsecond from each other.

The reading amplifier 39 feeds a serial-to-parallel converter 42, which produces over ten separate outputs lines LR, LM, LN, LJ, LI, LE, LD, LQ, LU and LZ, ten simultaneous signals representing the ten bits stored in the same binary denomination of the same decimal denomination of the ten registers respectively.

Therefore, at a given instant ten signals representing the first bit of the first decimal denomination of the ten registers are simultaneously present on said ten output lines; ten microseconds later, ten signals representing the second bit of the first decimal denomination are present on said output lines, etc.

Each group of ten signals simultaneously delivered on the output lines of the converter 42 after being processed is fed to a parallel-to-serial converter 43, which feeds the writing amplifier 41 with said ten signals restored in their previous serial order and spaced 1 microsecond from each other, whereby the transducer 40 writes in the delay lines said signals either unchanged or modified according to the operation of the computer, while maintaining their previous relative location. Therefore it is apparent that the single delay line LDR is equivalent, with respect to the external circuits which process its contents, to a group of ten delay lines working in parallel, each one containing a single register and provided with an output line LR, LM, LN, LJ, LI, LE, LD, LQ, LU and LZ respectively and with an input line SR, SM, SN, SJ, SI, SE, SD, SQ, SU and SZ respectively.

This interleaved arrangement of the signals in the delay line allows all the registers of the computer to be contained in a single delay line provided with a single reading transducer and a single writing transducer, whereby the ultimate cost of the memory does not exceed the cost of a delay line containing only one register. Moreover, as the pulse repetition frequency in the delay line is ten times greater than in the other circuits of the computer, it is possible to simultaneously attain a good utilization of the storage capacity of the delay line while using low speed switching circuits in the other parts of the computer, thus substantially reducing the cost of the machine.

As the delay line storage is cyclic in nature, the operation of the computer is divided into successive memory cycles, each cycle comprising twenty-two digit periods C1 to C22, and each digit period being divided into eight bit periods T1 to T8.

Figure 3:
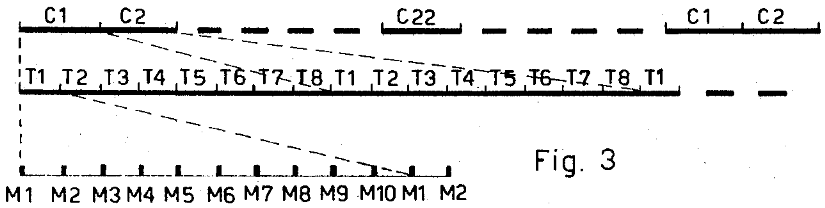
FIG. 3 shows a time diagram of some clock signals of the computer according to FIGS. 1*a* and 1*b*.

A clock pulse generator 44 produces on the output lines T1 to T8 successive clock pulse, each one having a duration which indicates a corresponding bit period, as shown in the time diagram of FIG. 3. Otherwise stated, the output terminal T1 is energized during the entire first bit period of each one of the twenty-two digit periods, the output terminal T2 is similarly energized during the entire second bit period of each one of the twenty-two digit periods, etc.

The clock pulse generator 44 is synchronized with the delay line LDR, as will be seen, in such a way that the beginning of the *n*th generic bit period of the *m*th generic digit period coincides with the instant in which the ten binary signals representing the ten bits read in the *n*th binary denomination of the *m*th decimal denomination of the ten memory registers begin to be available on the outputs lines of the serial-to-parallel converter 42. Said binary signals are staticized in the converter 42 for the entire duration of the corresponding bit period. During the same bit period the signals representing the ten bits produced by processing said ten bits read out of the delay line LDR are fed to the parallel-to-serial converter 43 and written in the delay line.

More particularly the generator 44 produces during each bit period ten pulses M1 to M10 (FIG. 3). The pulse M1 defines the reading time, that is the instant when the serial-to-parallel converter 42 begins to make available the bits pertaining to the present bit period, whereas the pulse M4 indicates the writing time, that is the instant when the processed bits are fed to the parallel-to-serial converter 43 for being written into the delay line LDR.

The generator 44 comprises an oscillator 45 which, when operative, feeds a pulse distributer 46 with pulses having the frequency of said pulses M1 to M10, a frequency divider 47 fed by said distributer being arranged to produce the clock pulses T1 to T8.

The oscillator 45 is operative only as long as a bistable device A10 (FIG. 6) remains energized, said bistable device being controlled by signals circulating in the delay line LDR, as will be seen.

Each decimal denomination of the memory LDR may contain either a decimal digit or an instruction. More particularly the registers I and J, which are designated as first and second instruction register respectively, are adapted to store a program comprising a sequence of 44 instructions written in the 22 decimal denominations of the registers I and J respectively.

The remaining registers M, N, R, Z, U, Q, D, E are normally numerical registers, each one adapted to store a number having a maximum length of 22 decimal digits.

Each instruction is made of eight bits B1 to B8 stored in the binary denominations T1 to T8 respectively of a certain decimal denomination: the bits B5 to B8 represent one out of 16 operations F1 to F16 whereas bits B1 to B4 generally represent the address of an operand upon which said operation is to be performed.

Each decimal digit is represented in the computer by means of four bits B5, B6, B7, B8 according to a binary-coded decimal code. In the delay line memory LDR said four bits are recorded in the last occurring four binary denominations T5, T6, T7, T8 respectively of a certain decimal denomination, while the remaining four binary denominations are used to store certain tag bits. More particularly, in this decimal denomination the binary denomination T4 is used for storing a decimal-point bit B4, which is equal to "0" for all the digit of a decimal number except the first entire digit after the decimal point. The binary denomination T3 is used for storing a sign bit B3, which is equal to "0" for all the decimal digits of a positive number and equal to "1" for all the decimal digits of a negative number. The binary denomination T2 is used for storing a digit-identifying bit B2, which is equal to "1" in each decimal denomination occupied by a decimal digit of a number and equal to "0" in each unoccupied decimal denomination (nonsignificant zero).

Therefore the complete representation of a decimal digit in the memory LDR requires the seven binary denominations T2, T3, T4, T5, T6, T7 and T8 of a given decimal denomination.

The remaining binary denomination T1 is used for storing a tag bit B1 whose meaning is not necessarily related to the decimal digit stored in said denomination.

In the following description a bit stored in a binary denomination *a* of a certain decimal denomination of a register *b* will be designated as B*ab*, and the signal obtained when reading said bit out of the delay line will be designated LB*ab*.

A bit *B1R*="1" stored in the first decimal denomination C1 of the register R is used to start the clock pulse generator 44 at the beginning of each memory cycle; a bit *B1E*="1" stored in the 22nd decimal denomination C22 of the register E is used to stop the generator 44; a bit *B1N*="1" stored in the *n*th decimal denomination of the register N indicates that during the execution of a program the next following instruction to be executed is the instruction stored in said *n*th decimal denomination of the register I or J; a bit *B1M*="1" stored in the *n*th decimal denomination of the register M indicates: when introducing a number from the keyboard into the register M, that the decimal digit next introduced is to be stored in the (*n*−1st) decimal denomination; when introducing an instruction from the keyboard, that the next following instruction is to be stored in the *n*th decimal denomination of the register I or J; when printing a number stored in any register selected among the registers of the delay-line, that the next following digit to be printed is the digit stored in the *n*th decimal denomination of said register; when adding together two numbers, that the digit of the sum stored in the *n*th decimal denomination of the register N shall be thereafter corrected by adding a filler digit thereto, as will be seen; a bit *B1U*="1" stored in the *n*th decimal denomination of the register U indicates that the execution of a main program routine has been interrupted at the *n*th instruction of the register I or J for beginning the execution of a subroutine. Therefore the tag bits B1R, B1E are used to represent fixed reference points in the various registers (beginning and end respectively); the tag bits B1N, B1M and B1U represent movable reference points within the registers; moreover the bits B1M are used, when performing an addition, to record, for each decimal denomination, an information pertaining to an operation performed or to be performed upon said denomination.

The regeneration and the modification and shifting of said tag bits B1 are performed by a tag-bit control circuit 37.

The computer comprises also a binary adder 72 provided with a pair of input lines 1 and 2 for concurrently receiving two bits to be added to simultaneously produce on the output line 3 the sum bit. More particularly, in a first embodiment shown in FIG. 4, the adder comprises a binary addition network 48, adapted to provide on the output lines S and R*b* the binary sum and the binary carry, respectively, produced by summing up two bits concurrently fed to the input lines 49 and 50 respectively and the previous binary carry bit resulting from the addition of the next preceding pair of bits, said previous binary carry bit being staticized in a carry bit storage A5 made of a bistable circuit. The signals representing the two bits to be added last from the pulse M1 to the pulse M10 of the corresponding bit period, and the signals representing the sum bit S and the carry bit R*b* are substantially simultaneous thereto. The previous carry bit is stored in the bistable circuit A5 from the pulse M10 of the next preceding bit period until the pulse M10 of the present bit period.

The new carry bit R*b* is transferred in a bistable circuit A4, in which it is staticized until the pulse M10 causes said new carry bit to be transferred into the bistable circuit A5, where it is staticized during the entire next following bit period so as to feed in proper time the addition network 48 during the addition of the next following pair of bits.

The input line 1 of the adder may be connected to the input line 49 of the addition network 48 either directly via a gate 52 or through an inverter 54 via a gate 53. Therefore it is apparent that in the first case each decimal digit is introduced without modification in the adder, whereas in the second case, as said digit is represented in binary code, the complement of said digit to 15 is introduced in the adder.

The gates 52 and 53 are controlled by a signal SOTT produced by a sign-bit processing circuit which will be described later.

The output line S of the addition network 48 may be connected to the output line 3 of the adder either directly via a gate 55 or via a gate 56 and an inverter 57 acting to complement the decimal digits to 15.

A bistable device 58 is energized through a gate 59 by every bit equal to "1" appearing on the output line S of the addition network 48 during the bit periods T6 and T7, and is deenergized through an inverter 61 and a gate 60 by every bit equal to "0" appearing on said output line S during the bit period T8.

Therefore, upon completion of the addition of a pair of decimal digits during the *n*th generic digit period, the circumstance that the bistable device 58 remains energized after the last bit period T8 of said digit period indicates that the sum digit is greater than nine and less than sixteen, whereby a decimal carry is to be transmitted to the next following decimal denomination. Through a gate 62 the output signal of the bistable device 58 indicating the presence of said decimal carry is fed into the carry storage A5, which is adapted to enter said decimal carry into the adding network 48 in the next following digit period $C(n+1)$.

A decimal carry toward said next following decimal denomination is to be transmitted also in the case during said bit period T8 of the present digit period C*n* a binary carry R*b*8 is produced by summing up the two most significant bits B8, since this binary carry indicates that the sum digit is greater than fifteen. The transmission of the decimal carry is made in this case by the bistable devices A4 and A5 in the manner described above.

Therefore in all cases the circumstance that the bistable device A5 is energized after the last bit period T8 of said digit period C*n* means that there is a decimal carry to be transmitted from said digit period C*n* to the next following digit period $C(n+1)$.

Should said digit period C*n* be the digit period in which the last (most significant) decimal digit among the digits of the two numbers to be added occurs, then through a gate 63 said decimal carry is stored into a bistable device RF. Therefore the bistable device RF when energized indicates that there exists an end carry resulting from the addition of the two most significant decimal digits.

Moreover the computer is provided with a shift register K comprising eight binary stages K1 to K8. Upon receiving a shift pulse over a terminal 4, the bits stored in the stages K2 to K8 are shifted into the stages K1 to K7 respectively, while the bits which are then present on the input lines 5, 6, 7, 8, 9, 10, 11, 12, 13 are transferred into the stages K1, K2, K3, K4, K5, K6, K7, K8 and again K8 respectively.

The pulses M4 produced by the pulse distributor 46 (FIG. 1*b*) are used as shift pulses for the register K, which therefore receives one shift pulse during each bit period, that is eight shift pulses during each digit period. The contents of each stage of the register K remains unchanged from the pulse M4 of each bit period until the pulse M4 of the next following bit period. Therefore it is apparent that a bit fed to the input line 13 of the register K during a certain bit period will be available on the output line 14 of the register K after eight bit periods, that is one digit period later, whereby under these conditions the register K acts as a section of delay line having a length corresponding to one digit period.

By connecting whatsoever memory register X and the shift register K in a closed loop while leaving all the remaining registers with their outputs directly connected to their respective inputs to form a closed loop, said register X is effectively lengthened one digit period with respect to said remaining registers. In this lengthened register X, the denomination which is read from the delay line concurrently with the *n*th decimal denomination of the remaining memory registers, that is during the *n*th digit period since the reading of the bit B1R which starts the generator 44, is conventionally defined as the *n*th decimal denomination. Therefore during each memory cycle the contents of the register X will be shifted one decimal denomination, that is delayed one digit period, with respect to the other registers.

Moreover the register K, due to its ability to act as a delay line, may be used as a counter according to the principles shown at page 198 of the book "Arithmetic Operations in Digital Computers", by R. K. Richards, 1955. More particularly, when its output line 13 and its input line 14 are connected to the output line 3 and to the input line 1 of the adder 72 respectively while the input line 2 of the adder receives no signal, said counter is adapted to count successive counting pulses which are fed to the carry storing bistable device A5 according to the following criterion. By considering the eight bits contained in the register K as a binary number comprising eight binary denominations, a counting pulse may be fed into the bistable circuit A5 whenever the less significant binary denomination is read out of the register K over the output line 14. Therefore the counting pulses shall be spaced in time one digit period or a multiple thereof.

The register K is also adapted to act as a buffer memory for temporarily storing a decimal digit or the address part of an instruction or the function part of an instruction to be printed by a printing unit 21.

The register K is also adapted to act as a parallel-to-serial converter when transferring data or instruction from the keyboard 22 into the delay line memory LDR.

The computer comprises also an instruction staticisor 16 including eight binary stages I1 to I8 for storing the eight bits B1 to B8 of an instruction respectively.

The first four stages I1 to I4 containing the address bits B1 to B4 of said instruction feed an address decoder 17 having eight output lines Y1 to Y8, each one corresponding to one of the eight addressable memory registers, and being energized when the combination of said four bits represents the address of said register. The address of the register M is represented by four bits equal to "0", whereby the register M is automatically addressed when no address is explicitly given. The remaining four stages I5 to I8 containing the function bits B5 to B8 of said instruction feed a function decoder 18 having a set of outputs F1 to F16, each output being energized when the combination of said bits B5 to B8 represents a corresponding function.

Moreover the outputs of the stages I1 to I4 and the output lines of the stages I5 to I8 may be connected, via gates 19 and 20 respectively, to the input lines of the stages K5 to K8 of the register K respectively in order to print out the address and the function respectively staticized in said stages.

A switching network 36 is provided for selectively interconnecting according to various patterns hereinafter specified, the ten memory registers, the adder 72, the shift register K and the instruction staticisor 16 in order to properly control the transmission of data and instructions to and from the various parts of the computer. Switching network 36 is made of a diode matrix or transistor NOR-circuit matrix or equivalent switching means having no storage properties.

The selection of the memory registers according to the present address indicated by the decoder 17 is also performed by the switching network 36.

The keyboard 22 for entering the data and the instructions and for controlling the various functions of the computer comprises a numeric keyboard 65 including ten numeral keys 0 to 9 which serve the purpose of entering numbers into the memory register M via the buffer register K, in a preferred embodiment the register M being the only memory register accessible from the numeral keyboard. Moreover the keyboard 22 comprises an address keyboard 68 provided with keys each one controlling the selection of a corresponding register of the delay line memory LDR.

The keyboard 22 comprises also a function keyboard 69, including keys each one corresponding to the function part of one of the instructions the computer can execute.

The three keyboards 65, 68 and 69 control a mechanical decoder made of code bars cooperating with electrical switches for producing on four lines H1, H2, H3, H4 four binary signals representing either the four bits of a decimal digit set up on the keyboard 65 or the four bits of an address set up on the keyboard 68, or the four bits of a function set up on the keyboard 69, said decoder being also adapted to energize either an output line G1 or G2 or G3 to indicate whether the keyboard 65 or 68 or 69 respectively has been operated.

A decimal point key 67 and a negative algebraic sign key 66, when operated, directly produce a binary signal on the line V and SN respectively.

Some instructions the present computer can execute are listed below, the letter Y designating the selected register corresponding to the address staticized in the staticisor 16:

(F1) Addition: transfer the number stored in the selected register Y into the register M, then add the contents of the register M to the contents of the register N and store the result in the register N, that is symbolically: Y—M; $(N+M)$—N;

(F2) Subtraction: similarly Y—M; $(N-M)$—N;

(F3) Multiplication: Y—M; $(N \cdot M)$—N;

(F4) Division: Y—M; $(N \div M)$—N;

(F5) Transfer from M: transfer the contents of the register M into the selected register, that is M—Y;

(F6) Transfer into N: transfer into the register N the contents of the selected register, that is Y—N;

(F7) Exchange: transfer the contents of the selected register into the register N and vice versa, that is Y—N; N—Y;

(F8) Print: Print-out the contents of the selecter register Y;

(F9) Print and zeroizes: print-out the contents of the selected register Y and zeroize same;

(F10) Program stop: stop the automatic execution of the program and wait until operator enters a datum into the keyboard; introduce said datum into the selected register Y (thereafter either automatic program execution or manual operation may be continued);

(F11) Extract from the register I one out of the first eight characters as specified by the address contained in the present instruction, and transfer said character into register M;

(F12) Jump to the program instruction specified in the present instruction, unconditional;

(F13) Jump, conditional.

The computer may be selectively preset to operate according to three modes, namely "manual," "automatic" and "entering program" depending on whether a three-position commutator 23 generates a signal PM, PA or IP respectively. All the aforementioned instructions may be executed in the automatic operation; the first nine instructions may also be executed in the manual operation.

During the program entering operation, the signal IP being present, the address keyboard 68 and the function keyboard 69 are operable to enter the program instructions into the registers I and J via the buffer register K. For this purpose the outputs H1 to H4 of the keyboard decoder may be connected, via gate 24, to the inputs 8 to 11 respectively of the register K. In the meantime, the keyboard 65 is inoperative.

During the automatic operation, in which the program previously entered into the memory LDR is executed, the address keyboard and the function keyboard are inoperative.

The automatic operation comprises a sequence of instruction-extract phases and instruction-execute phases. More particularly during an exact phase an instruction is extracted from the program register I, J and transferred into the staticisor 16; this phase is automatically followed by an execution phase, in which the computer under the control of said staticized instruction executes said instruction; this execution phase is automatically followed by an extraction phase for the next following instruction, which is the extracted and staticized in lieu of the preceding one etc. As long as an instruction is staticized the staticisor 16, the numeric register indicated by the address part of said instruction remains continuously selected, and the decoder 18 continuously produces the function signal corresponding to the function part of said instruction. During the automatic operation, also the numeric keyboard is normally inoperative, because the computer operates upon the data previously entered into the memory. This keyboard is operated only when the program instruction at present staticized is the stop instruction F10. It is apparent that this instruction allows much more data to be processed than the computer memory may contain.

During the manual operation the numeric keyboard, the address keyboard and the function keyboard may be all operative. More particularly according to this mode of operation the address keyboard and the function keyboard may be used by the operator to cause the computer to perform a sequence of operations similar to any sequence performed during the automatic operation. For this purpose the operator enters via the keyboard an address and a function, which are therefore staticized via gates 70 and 71 respectively in the staticisor 16 just like during an instruction-extract phase in the automatic operation. Moreover, by entering said instruction (address and function) into the keyboard, an instruction-execution phase is automatically instituted for executing said entered instruction in a manner similar to the execution phase in the automatic operation. Upon completion of said instruction-execution phase the computer stops and waits for a new instruction entered by the operator through the keyboard.

As previously mentioned, when no address key is operated, the register M, which is specialized to receive the data from the keyboard, is automatically addressed. Therefore, when entering via the keyboard one of the instructions F1, F2, F3, F4 corresponding to the four fundamental arithmetic operations, the operator may select not to operate the address keyboard but instead to enter a number through the numeric keyboard; in this case said operation will be performed upon said entered numbers. Therefore during the manual operation any arithmetic operation corresponding to the key depressed in the function keyboard 69 may be performed either upon a number previously entered into the register M via the numeric keyboard 65 or upon a number stored in a memory register selected by means of the address keyboard.

More over it has been seen that during the automatic operation the functions specified in the instructions are executed upon the data previously entered in the memory. Before pushing the button AUT to start the automatic program execution, the operator after having set the computer to operate in the manual mode, may enter each one of said initial data, by first entering said datum through the numeric keyboard into the register M, then depressing the address key corresponding to the register in which said datum is to be stored, and then depressing the function key corresponding to the transfer instruction F5.

Figure 1A:
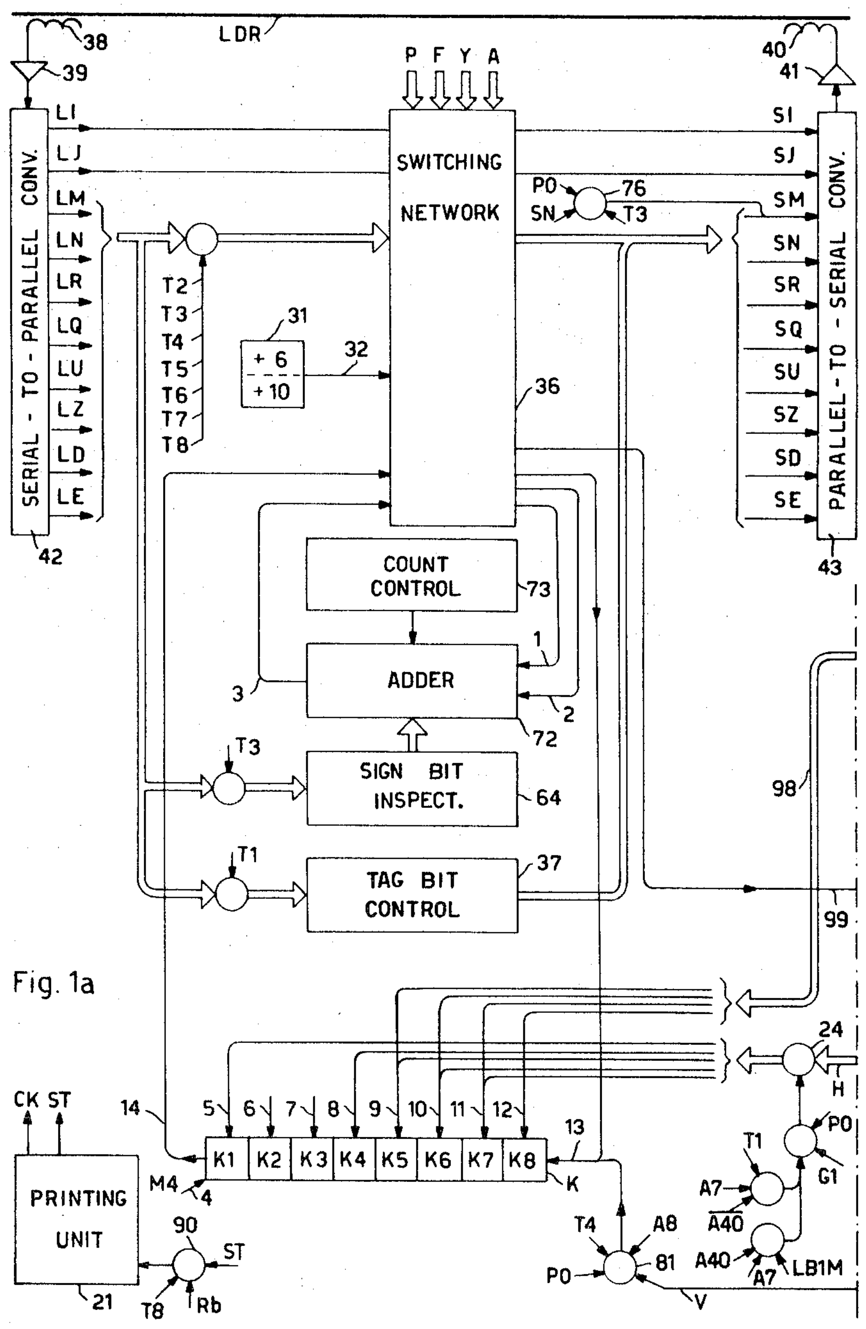
FIGS. 1*a* and 1*b* are to be composed.
Figure 1B:
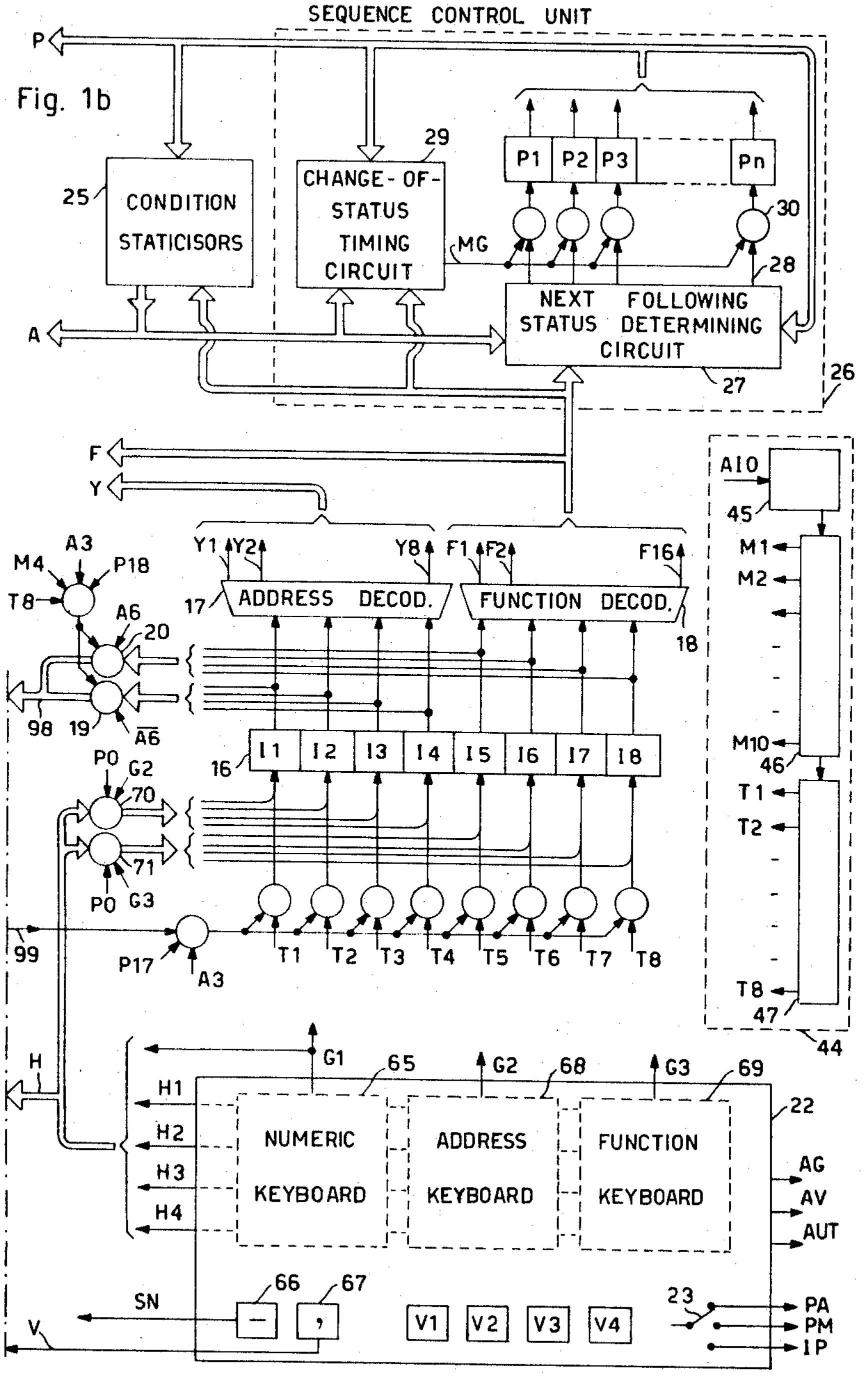
Figure 5:
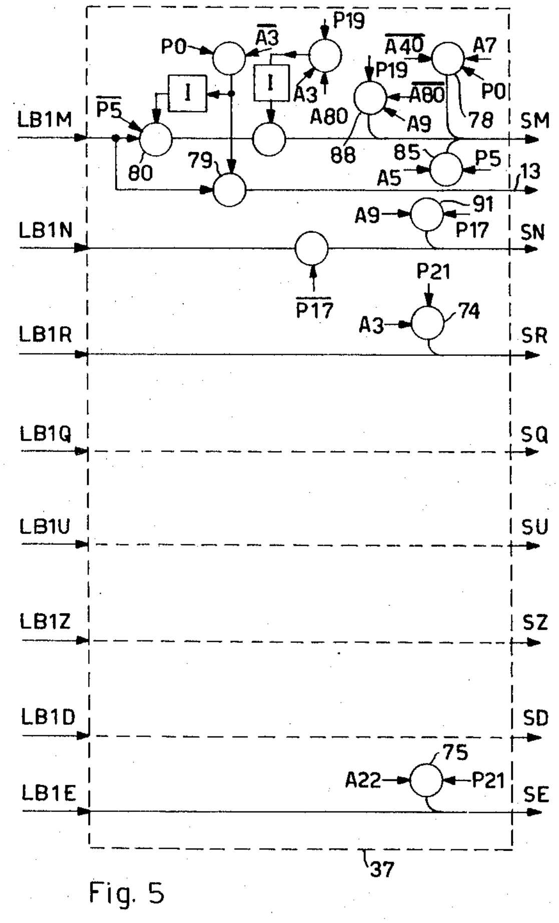
FIG. 5 shows a circuit for controlling the tag-bits used in the computer according to the invention.
Figure 6:
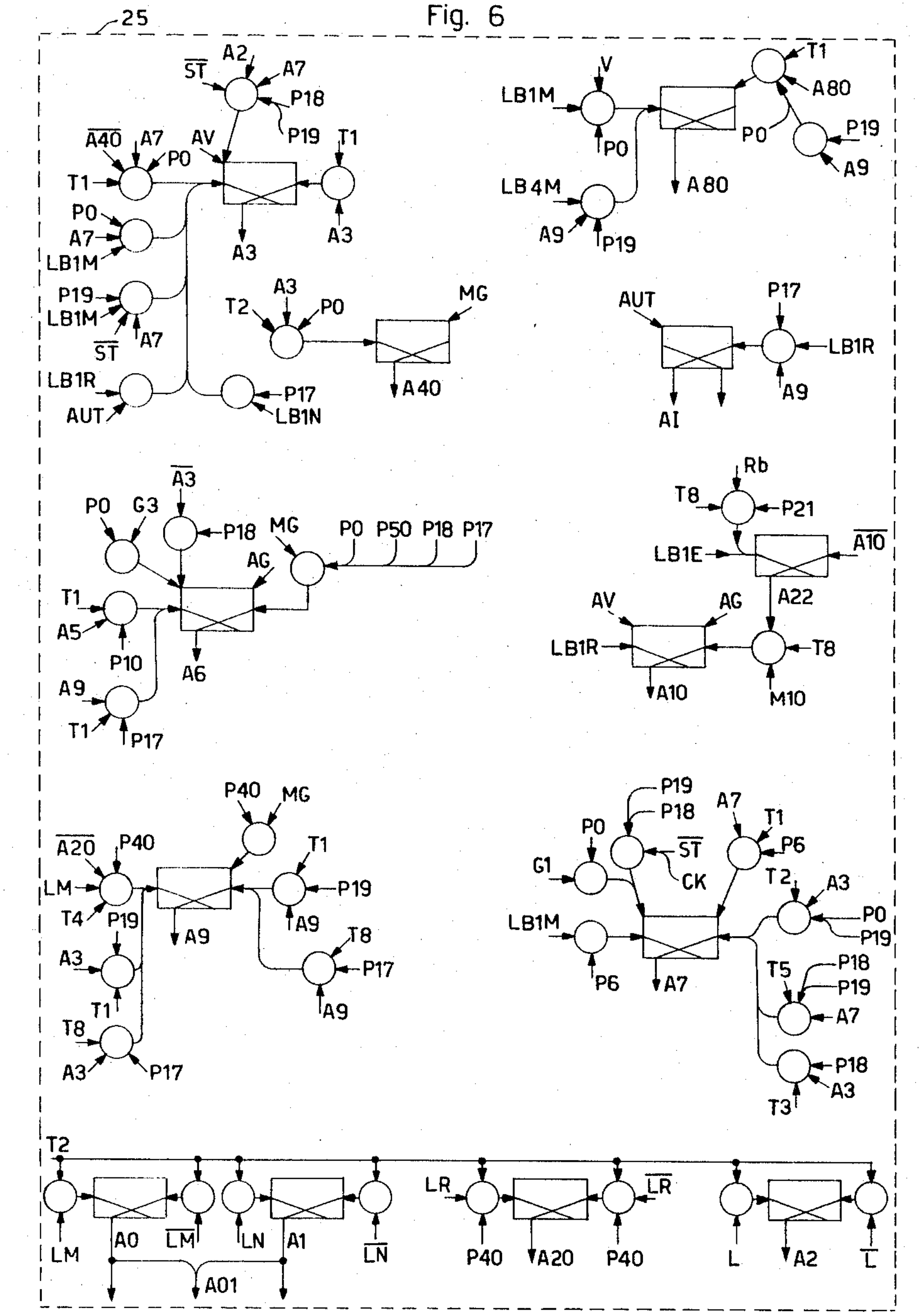
FIG. 6 shows a group of bistable devices of the computer according to FIGS. 1*a* and 1*b*.

The computer comprises also a group of bistable devices collectively represented by a box 25 in FIG. 1*b* and in more details in FIG. 6. These bistable devices are used, inter alia, to staticize some internal conditions of the computer, the output signals of said bistable devices representing said conditions being collectively designated by the reference letter A in the block diagram of FIG. 1.

More particularly, the bistable device A0 is energized during each memory cycle upon reading in the register M the first binary denomination T2 storing a digit indicating bit B2 equal to "1" and is thereafter deenergized upon reading the first binary denomination T2 storing a digit indicating bit B2 equal to "0", whereby the bistable device A0 remains energized during the entire time interval spent in reading out the number stored in the register M. Otherwise stated, the bistable device A0 indicates within each memory cycle the length and the position of the number stored in the register M. It is to be pointed out that according to a feature of the present invention said length and said position are completely variable.

The bistable devices A1 and A2 are adapted to give a similar indication as to the length and position of the number stored in the register N and Y respectively, Y designating the register at present addressed and selected. For this purpose the bistable devices A1 and A2 are controlled by the output LN of the register N and by the output L of the selected register Y respectively. The outputs of the bistable devices A0 and A1 are combined to produce a signal A01 which lasts, during each memory cycle, from the reading time of the first decimal digit among the decimal digits of the numbers M and N until the reading time of the last occurring decimal digit among said decimal digits.

The bistable device A3 is normally used to distinctively indicate a certain digit period during which a certain operation is to be performed, said indication being obtained in that it remains energized during said digit period and deenergized during the other digit periods.

The bistable device A7 is normally used to distinctively indicate a certain memory cycle or a part thereof during the operation of the input and output units of the computer.

The bistable devices A6, A8, A9 are used to indicate the occurrence of certain conditions during the execution of certain instructions.

The function of other bistable devices of the group 25 will be described later.

The computer is also provided with a sequence control unit 26 comprising a group of status-indicating bistable devices P1 to P*n*, which are energized one at a time, whereby at any time the computer is in a certain status corresponding to one of the bistable devices P1 to P*n* at present energized. In its operation the computer goes through a sequence of statuses, and accomplishes certain elemental operations during each status. The sequences of said statuses is determined according to a criterion established by a logical network 27. More particularly on the basis of the present status of the computer indicated by the bistable devices P1 and P*n* via the line P, of the instruction at present staticized in the staticisor 16 and indicated by the decoder 18 via the line F, and of the present internal conditions of the computer indicated by the group of condition-staticizing bistable devices 25 via the line A, said network 27 decides what status must follow and gives an indication of said decision by energizing the output 28 which corresponds to said status. Thereafter a timing network 29 produces a change-of-status timing pulse MG, whereby one of the bistable devices P1 to P*n* corresponding to said next following status is energized via the gate 30 corresponding to said output 28, while all the remaining status-indicating bistable devices of the group P1 to P*n* are deenergized.

*Transferring a number to and from a memory register*

The transfer operations between the registers of the memory LDR are normally performed in a status P2 having a duration of a single memory cycle, that is since the oscillator 45 starts until it starts the next time. More particularly in said status P2, both in the manual and in the automatic mode of operation, assuming the instruction Y, F6 is staticized in the staticisor 16 (this means that the register at present selected is the generic register Y and the function at present staticized is F6), switching network 36 connects the output of each register except the register N to the respective input in a closed loop so as to cause its contents to be continuously regenerated and further connects the output of the addressed register Y to the input SN of the register N, whereby during a single memory cycle the contents of the register Y is transferred into the register N.

Should the instruction staticized in the staticisor 16 be equal to Y, F7, the switching network 36 connects in a distinct closed loop every memory register, except the register N and the addressed register Y, for the purpose of regenerating its contents, and further connects the output of the register N to the input of the register Y and the output of the register Y to the input of the register N, whereby the contents of the register Y is transferred into the register N and vice versa.

Should the instruction staticized into the staticisor 16 be equal to either Y, F1 (addition) or Y, F2 (subtraction) or Y, F3 (multiplication) or Y, F4 (division) or Y, F5 (transfer from M), the switching network 36 connects into a distinct closed loop every register, except the register M, for continuously regenerating its contents, and further connects the output of the addressed register Y to the input of the register M, whereby the contents of the register Y is transferred into the register M.

In all cases, should the instruction have no address specified therein, the register M is selected.

Whatever the instruction staticized by the staticisor during the status P2 may be, when the generator 44 starts again, the gate 84 in the circuit 29 is opened to produce a change-of-status timing pulse MG, which causes the computer to switch to the next following status as determined by the nature of the instructure itself.

Should the staticisor 16 have the multiplying instruction Y, F3 staticized therein, in a status P9 of the computer the switching network 36 interconnects the memory registers so as to transfer the contents of the register N into the register R.

Any other transfer operation is accomplished in a similar manner.

*Aligning the numbers stored in the memory*

As previously explained, the numbers are entered from the keyboard in the register M without regard to their alignment with respect to either the numbers already stored in the other registers or any reference point of the registers themselves. Before executing any arithmetic operation, the numbers to be operated upon are aligned in the following manner.

It has been pointed out that by connecting a register of the memory LDR and the shift register K so as to build up a closed loop, the contents of said memory register is delayed with respect to the other memory registers one digit period during each memory cycle.

It is first assumed that the number stored in the register M is to be aligned so as to bring its first integer digit (having the decimal point associated therewith) into the first decimal denomination C1.

In the aligning status P3, the switching network 36 connects the output and the input of the register whose contents is to be aligned, for instance the register M, to the input and the output, respectively, of the shift register K, and the output of each one of the remaining memory registers to its respective input. Therefore, in each memory cycle the contents of the register M is delayed one digit period with respect to the remaining memory registers, until during the first digit period C1 (identified by reading out of the delay line the tag bit $B1R$="1") of a certain memory cycle the decimal point (identified by reading out of the delay line a decimal point bit $B4$="1") is found. The simultaneous occurrence of said two reading pulses energizes, via a circuit not shown in the drawings, the bistable device A6, which thus indicates in this case that the required alignment has been accomplished. Therefore, as the bistable device A6 is energized, in the circuit 29 upon reading once more the first digit of the number M or N the leading edge of the signal A01 produces via gate 86 a change-of-status timing pulse MG which causes the computer to switch to the next following status.

In a similar manner, the computer being in a status P14, a number may be shifted until its most significant digit is in the first decimal denomination C1 of a certain register, this kind of alignment being used for instance for the multiplier during multiplication.

In a similar manner, preparatory to the printing out of a number stored in a certain register, of said number may be aligned to have its least significant digit in the first decimal denomination C1 of said register. It is apparent that this aligning operation requires at least as many memory cycles as are non-significant zeroes in said number, because the number is delayed (shifted toward the most significant denominations) one decimal denomination during each memory cycle. Therefore during this aligning operation the number may be scanned beginning from the most significant denominations, in order to eliminate the non-significant zeroes one at each memory cycle before printing out.

In general, it is apparent that by using the tag bits the numbers may be aligned according to different criteria.

*Comparing the algebraic signs of two numbers*

In the status P9 of the computer, in the circuit 64 (FIG. 4) the sign bits B3 of the two registers involved are inspected and compared. Should disagreement occur, a bistable device A8, which had been energized at the beginning of said status, is deenergized. Therefore, the circumstance that after the status P9 the bistable device A8 remains either energized or not indicates that the signs of the two numbers examined are equal or not. The output ADD of the circuit 64 is energized when either the add instructions F1 is staticized and the bistable device A8 is energized or the subtract instruction F2 is staticized and the bistable device A8 is deenergized.

*Addition and subtraction*

The addition and the subtraction of two numbers stored in the registers M and N respectively are accomplished according to the following rules. A true addition is performed when either the signs of the numbers M and N are equal (bistable device A8 is energized) and the instruction at present staticized in F1 (addition) or the signs of the numbers N and M are different (bistable device A8 is deenergized) and the instruction at present staticized is F2 (subtraction). In the other cases a subtraction is effectively performed.

To perform an addition, during a first memory cycle, in which the computer is in the status P5, the two numbers N and M are added together digit by digit, a decimal carry being transmitted to the next higher decimal denomination if the sum digit either is greater than 15 or lies between 10 and 15, the first circumstance being indicated by the presence of a final binary carry R8 produced by summing up the most significant bits B8 and the second circumstance being indicated by the energization of the bistable device 58. For this purpose the output of the bistable device 58 during the execution of an addition is connected to the summing network 48 via a gate 62. The result obtained by adding together the two numbers in the above manner is not correct, in that some digits of the result may be greater than nine and therefore have no meaning in the binary-coded decimal code, whereby a radix correction from the binary code to the binary-decimal code is to be performed. To this end during the single memory cycle in which the computer is in the status P5 allotted to the computation of the uncorrected sum a tag bit B1M is recorded in each decimal denomination to indicate the nature of the radix correction to be performed upon the corresponding sum digit, during a following memory cycle (in which the computer is in the status P6) said sum being corrected digit by digit according to the indications given by said tag bits.

More particularly, in the case of the addition, during the second memory cycle, in which the computer is in the status P6, each digit of the sum is corrected from the binary code to the binary-decimal code by adding the filler digit +6 to each digit of the result which in the first memory cycle (while computing the uncorrected sum) had produced a decimal carry.

Therefore the addition is accomplished within two memory cycles, in which the computer is in the status P5 and P6 respectively.

In order to execute the subtraction, during a first memory cycle, in which the computer is in the status P5, the numbers M and N are added together, after having complemented to 15 each decimal digit of the number N. During this cycle a decimal carry is transmitted from a denomination to the next higher denomination only if the sum digit for the first mentioned denomination is greater than 15 (this circumstance is indicated by the presence of a final binary carry R8 from the highest binary denomination T8 of said denomination), no decimal carry being transmitted if said sum digit lies between 10 and 15. For this purpose the gate 62 is held closed for preventing the output of the carry indicating bistable device 58 from being connected to the summing network 48. The absence of an end decimal carry RF resulting from the addition of the two most significant decimal digits of the numbers M and N respectively indicates in this status P5 that the number M is less than the number N, where as the presence of said final carry RF indicates that the number N is less than the number M.

In the first case, during a following memory cycle (in which the computer is in the status P6) the radix correction is performed by adding either the filler digit +6 or +0 to each digit of the uncorrected sum depending on whether in the status P5 when adding the pair of most significant bits B8 of the corresponding decimal denomination a binary carry R8 had been produced or not. Moreover in the status P6 each digit of the sum, while being corrected, is also complemented to 15 again, whereby the subtract operation is completed within two memory cycles. If, on the contrary, the number N is less than the number M (this circumstance is indicated by the presence of said end carry RF in the status P5) in the status P6 the filler digits to be added to each digit of the uncorrected result a·e +0 and +10 respectively for the two cases previously considered; moreover in the status P6 the result is not recomplemented, but instead during a new memory cycle (in which the computer is in the status P7) the number +1 is added to the corrected result, thus obtaining a new result which is in turn corrected from the binary to the binary-decimal code during a following memory cycle (in which the computer is in the status P8). Therefore in this case the operation is completed in four memory cycles (corresponding to the four statuses P5, P6, P7 and P8 respectively).

The operation of the computer during the addition and the subtraction will now be described in more details.

After having aligned the two numbers M and N with respect to their decimal point in the statuses P3 and P14 respectively, and after having examined the signs of the two addends in the status P9, the computer switches to the status P5. During this status the bistable device A8 continues to give an indication as to the agreement of the signs of the two addends as determined in the status P9, whereby in the status P5 the circuit 64 (FIG. 4) produces a signal SOTT if either there is a sign disagreement and the instruction at present staticized is F1 (addition) or there is a sign agreement and the instruction at present staticized is F2 (subtraction), whereas in any other case the circuit 64 produces a signal ADD.

In the status P5 the switching network 36 permanently connects the outputs LN and LM of the registers N and M to the two inputs 1 and 2 of the adder 72 respectively, the output 3 of the adder to the input 13 of the register K and the output 14 of the register K to the input SN of the register N. Moreover the output of all the memory registers, except the register N, is connected to the respective input. Therefore in this status, which lasts a single memory cycle, the contents of the register M, without being destroyed, is added to the contents of the register N, the latter contents having been either complemented to 15 digit by digit via the complementer 34 or not depending on whether the signal SOTT or ADD is present, the result being written in the register N via gate 55, while the contents of all the other registers is regenerated so as to remain unchanged.

More exactly, the connection between the inputs 1 and 2 of the adder and the outputs LM and LN of the registers M and N exists only during the bit periods T5, T6, T7 and T8 of each digit period.

During the remaining bit periods T1, T2, T3 and T4 the switching network 36 directly connects the output of the register N to the input of the register K, so as to bypass the adder 72, whereby the bits B1, B2, B3, B4 of each decimal denomination, which are tag bits to be held unmodified in this phase, are regenerated.

On the contrary during the bit period T5, T6, T7, T8 of the generic $n$th decimal denomination the bits B5, B6, B7, B8 respectively of the corresponding decimal digit of the number M are added to the bits B5, B6, B7, B8 respectively of the corresponding decimal digit of the number N (the four last mentioned bits being inverted by the inverter 53 if the signal SOTT is present), each pair of corresponding bits being fed to the adder along with the binary carry produced by adding the next preceding pair of bits and staticized in the bistable device A5, whereby the adder 72 produces in each digit period during the bit periods T5, T6, T7 and T8 respectively, four bits representing a decimal digit of the uncorrected sum. Due to the previous explained connection of the register, said uncorrected sum digit, assuming it has been produced by adding two addend digits stored in the $n$th decimal denomination of the registers M and N respectively, is recorded in the ($n-1$st) decimal denomination of the register N.

During said generic $n$th digit period, and more exactly at the end of the last bit period T8 thereof, the binary-carry staticizing bistable device A5 is as usually energized or not depending on whether the sum of the last pair of bits B8 has generated a final binary carry R8 or not. The bistable device A5 thereafter remains as usually in the energized state until it receives from the bistable device A4 the new binary carry produced by summing up the next following pair of bits, which in this case are the first bits B5 of the next following digit period $C(n+1)$. Therefore it is apparent that the bistable device A5 is adapted to feed said final binary carry R8 of the $n$th decimal denomination to the adder 72 when the adder receives the first pair of bits B5 of the ($n+1$st) decimal denomination. As said final binary carry indicates also the presence of a decimal carry, it is clear that said bistable device A5 is also adapted to transmit the decimal carry between said two decimal denominations. This happens both in the case of addition (signal ADD is present) and in the case of subtraction (signal SOTT is present). Moreover in the case of addition, but not in the case of subtraction, gate 62 is opened during the bit period T1 immediately following said bit period T8 for connecting the bistable device 58 to the bistable device A5, whereby in the case of addition when the adder receives the first pair of bits B5 of the ($n+1$st) decimal denomination the bistable device A5 feeds a decimal carry to the adder not only if the sum digit in the $n$th denomination was greater than fifteen but also if said sum digit was between ten and fifteen.

Therefore, in every case, in the status P5 the fact that the bistable device A5 is energized during the bit period T1 of the ($n+1$st) digit period indicated that a carry has been transmitted from the $n$th to the ($n+1$st) decimal denomination. In said bit period T1 the tag bit controlling circuit 37 causes a tag bit $B1M$="1" to be written into the ($n+1$st) decimal denomination of the register M via a gate 85 if said decimal carry has been produced in the $n$th decimal denomination. The same happens for each one of the successive digits to be added. It is to be noted that said tag bit is effectively written via gate 85 in the proper denomination because writing in the register N is now effectively delayed one digit period with respect to writing in the register M due to the fact that in the present status the contents of the register N recirculates through the register N and the shift register K while the contents of the register M recirculates only through the register M itself.

Furthermore, it is to be noted that, due to the aforesaid connection of the registers N, K and M (register M has its input directly connected to its output, while register N has its input and its output connected to the output and to the input respectively of the register K, which is long one digit period) at the end of the status P5, which lasts a single memory cycle, the uncorrected result of the addition, stored in the register N, will appear as delayed one digit period with respect to the contents of the register N.

Only in the case of subtraction (signal SOTT is present) in the first bit period T1 following the digit period in which the last (most significant) pair of decimal digits of the numbers M and N has been added, the decimal carry signal, if any, produced by adding said last pair of decimal digits is sent via gate 63 to energize the bistable device RF. The bistable device RF will thereafter indicate during the following memory cycles the existence of said end carry, whereby the circumstance that said bistable device RF is either energized or not will indicate whether the number N was less than the number M or not.

It is to be noted that gate 63 may be opened only after disappearance of the signals A1 and A0 indicating the length and position of the number N and M, whereby the bistable device is responsive only to the end carry produced by adding the last pair of digits.

Upon completion of this summation cycle, the leading edge of the signal A01 produces via gate 87 in the circuit 29 a change-of-status timing pulse MG which causes the computer to switch to the next following status. This status, as determined by the logic network 27, is the status P6, which lasts a single memory cycle and is spent for the correction of the sum.

The status P5 is always followed by the status P6, whatever the internal conditions of the computer may be.

In the status P6 the switching network 36 connects the register M and the register K so as to build up a closed loop, whereby the contents of the register M is delayed one decimal denomination with respect to the register N. Since in the preceding status P5 the contents of the register N had been delayed the same amount with respect to the register M, the two numbers M and N are thus restored into their previous alignment with respect to the decimal point. Moreover the switching network 36 connects the inputs 1 and 2 of the adder to the output LN of the register N and to the output 32 of a filler digit generator 31, and the output 3 of the adder to the input SN of the register N. As previously explained, due to the relative displacement of the numbers stored in the registers M and N, in this status P6, when beginning to read out of the delay line the *n*th decimal denomination of the register N, the tag bit B1M is read out of the delay line, this tag bit indicating what kind of radix correction is to be performed upon said *n*th digit of the uncorrected sum stored in the register N. More particularly the reading signal LB1M produced by reading said tag bit from the memory LDR either energizes the bistable device A7 or not depending on whether its value is "1" or "0," said bistable device A7 being thereafter deenergized at the beginning of the next following clock pulse T1, whereby during the entire *n*th digit period the bistable device A7 indicates what kind of correction is to be performed upon the uncorrected sum digit stored in said *n*th denomination of the register N.

More particularly, if an addition is being performed (signal ADD is present), the bistable device RF is surely deenergized, because, as previously stated, the existence of an end carry RF produced during the status P5 by adding together the most significant pair of digits has no relevance in the case of addition.

In the case of addition, in the status P6 the output S of the addition network 48 is connected to the output 3 of the adder 72 via gate 35, whereby the corrected sum produced in said status P6 is not recomplemented. Moreover, while feeding the input 49 of the addition network 48 with the digit of the *n*th decimal denomination of the register N (uncorrected sum) via gate 52, the filler digit generator 31 simultaneously feeds the input 2 with the filler digit 6, whose code representation $B5=0$, $B6=1$, $B7=1$, $B8=0$ is produced via gate 33 provided the bistable device A7 is simultaneously in the energized state; if on the contrary the bistable device A7 is deenergized, generator 31 feeds the input 2 with the decimal digit 0, which is represented by four binary zeroes.

In the case of subtraction (signal SOTT is present) and if in the preceding status P5 no end decimal carry RF has been produced, whereby the bistable device RF also in this case is deenergized, in the status P6 the output S of the addition network 48 is connected to the output 3 of the adder 72 via gate 56 and inverter 57, whereby each bit B5, B6, B7, B8 of the corrected sum is inverted (and so the decimal digit represented by said four bits is recomplemented to 15) before being rewritten into the register N. The radix correction of the sum is accomplished by adding to each digit of the uncorrected sum either the filler digit 6 via gate 33 of the filler digit generator 31 or 0 as in the previous case.

If, on the contrary, in the case of subtraction, the signal RF is present to indicate that in the preceding status P5 an end decimal carry had been produced, the corrected sum produced by the adder 72 in the status P6 is written into the register N via gate 55 without complementing. Moreover in this case while feeding the addition network 48 via gate 52 with the bits B5, B6, B7, B8 of the uncorrected sum digit contained in the generic *n*th digit period of the register N, the filler digit generator 31 simultaneously produces via gate 34 the bits $B5=0$, $B6=1$, $B7=0$, $B8=1$ representing the decimal number 10 if the bistable device A7 is in the deenergized state during said digit period; if on the contrary the bistable device A7 is energized, the decimal digit 0, represented by four binary zeroes, is fed.

In all the three aforesaid cases (addition, subtraction with M less than N, subtraction with N less than M), during the status P6 the leading edge of the signal A01 produces, via the gate 87 of the circuit 29, a change-of-status timing pulse MG which causes the computer to switch to the next following status.

So in the first two cases the addition, respectively the subtraction, is completed, whereby the logic network 27 designates as the next following status either the status P17 (extract the next following instruction) if the computer is preset for the automatic mode of operation and the instruction F1 (addition) or F2 (subtraction) is at present staticized, or the status P18 (begin to print out the first addend) if the computer is preset for the manual mode of operation and the instruction F1 (addition) or F2 (subtraction) is at present staticized.

On the contrary, in the third case, in which the bistable device RF remains energized, the status P6 is followed by the status P7, in which the number +1 is added to the result stored in the register N and by a status P8 in which the digits of the new result thus obtained are corrected from the binary code to the binary decimal-code, the operation of the computer in said statuses P7 and P8 being similar to the operation in the statuses P5 and P6 respectively. In the status P8 the leading edge of the signal A01 indicating that there are no more digits to be added, causes the computer to switch (see FIG. 7) to the next following status, which is either the status P17 or the status P18 or another status as previously explained.

As to the sign of the result, in the status P6 the sign bits recorded in the register N are regenerated without modification if in the status P5 no end decimal carry RF has been produced, whereas they are inverted by obvious means not shown in the drawings before being rewritten into the delay line LDR if the final carry RF is present.

According to a second embodiment of the computer according to the invention, not shown in the drawings, the addition and the subtraction are performed according to the following rules.

In a first memory cycle (in which the machine is in the status P40) the number M is added to the number N after having complemented each digit of the number N to 15, for the only purpose of determining, on the basis of the existence of an end decimal carry RF, whether N is greater than M or not.

The operation of the computer in this status P40 is quite similar to the operation in the status P5 according to the first embodiment when the signal SOTT was present, apart that now the register N is not connected to the register K but has its output connected to its input via the adder 72.

During a second memory cycle (in which the computer is in the status P50) the number M is added to the number N, the several digits of the greater one of the two numbers M and N being either complemented to 15 or not depending on whether a subtraction or an addition is being performed. For this purpose the switching network 36 connects either the output LN of the register N and the output LM of the register M to the inputs 1 and 2 respectively of the adder 72 or vicse versa depending on whether said signal RF is present or not, the input 1 being anyway connected to the input 49 via the complementer 54. In a third memory cycle (in which the computer is in the status P60) the correction from the binary code to the binary-decimal code is performed by adding the filler digit +6 to each uncorrected sum digit which has produced a final binary carry R8 and the filler digit +0 to each other uncorrected sum digit. Moreover the digits of the result are recomplemented to 15 if a subtraction is being performed.

Figure 4:
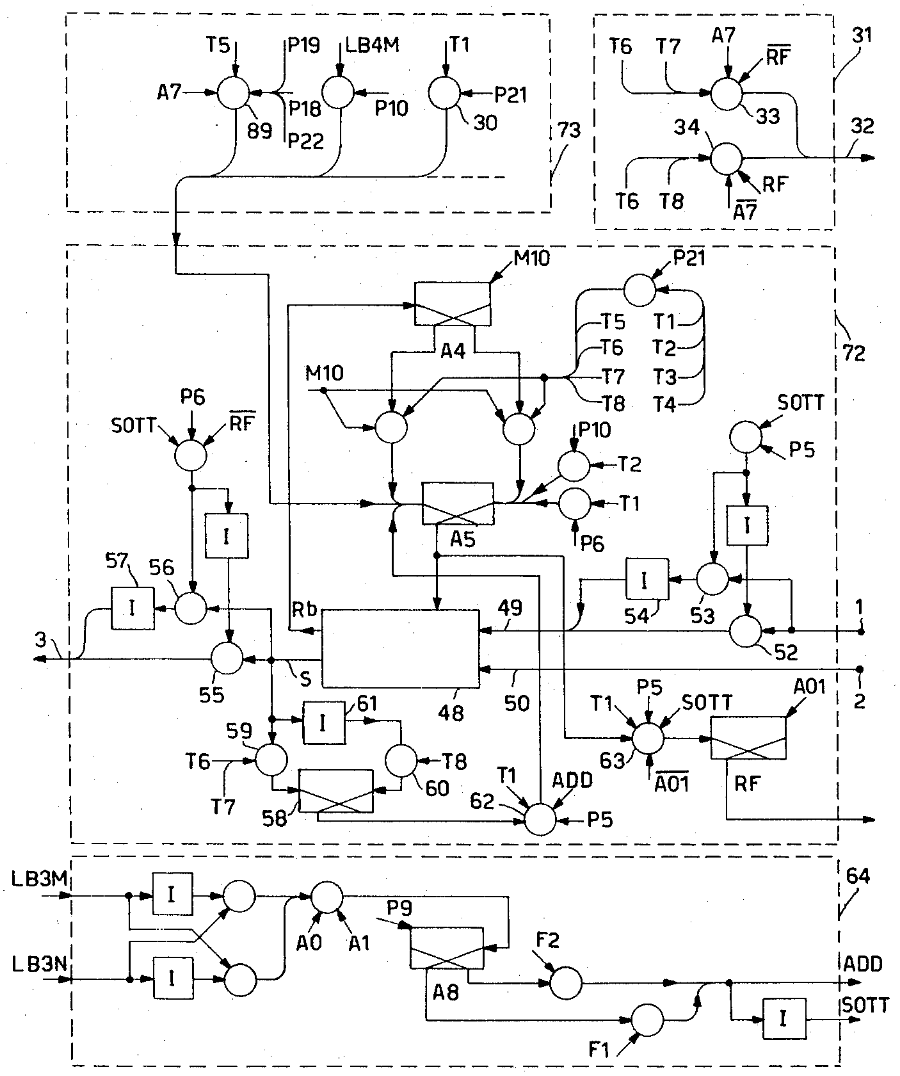
FIG. 4 shows an adder used in an embodiment of the computer according to the invention.

The modifications to be made in the adder shown in FIG. 4 to make its capable of operating according the preceding rules are obvious to those skilled in the art.

From the foregoing it is apparent that whenever the instruction staticisor 16 staticizes the instruction Y, F1 (addition) or Y, F2 (subtraction), the computer is adapted under the control of the sequencing circuit 26 to automatically go through a sequence of statuses which, according to the second embodiment of the adding device of the computer, is as schematically shown in FIG. 8.

More particularly, starting either from the status P0 in which said instruction is set up on the keyboard in the manual operation or from the status P17 in which said instruction is extracted from the memory LDR in the automatic operation, the addition (or subtraction) sequence comprises:

status P2, wherein the contents of the register Y addressed by said instruction is transferred into the register M;
statuses P3 and P14, wherein the numbers stored in the registers M and N respectively are aligned so as to have their decimal point located in the first decimal denomination C1;
status P9, wherein the two numbers M and N are examined to determine whether their algebraic signs are in agreement;
status P40, wherein the two numbers M and N are examined to determine whether number M is greater than number N or not;
status P50, wherein the two numbers M and N are added together;
status P60, wherein the radix correction for the sum so obtained is performed.

After this sequence, the computer, if preset for the automatic mode of operation, automatically reverts to the status P17, wherein the next following instruction is extracted; if preset, on the contrary, for the manual mode of operation, it goes through the sequence of statuses P18, P19, P22 during which the number Y is printed out and thereafter it reverts to the status P0 wherein the next following instruction is set up on the keyboard.

*Multiplication and division*

If the instruction at present staticized in the staticisor 16 is Y, F3 (multiplication) the sequence of statuses the computer goes through, starting either from the status P0 (if in manual operation) or from the status P17 (if in automatic operation), is as follows (FIG. 8*b*):

status P2 (lasting one memory cycle) wherein the number stored in the register Y (multiplicand) addressed by said instruction is transferred into the register M;
status P3, wherein the number stored in the register M (multiplicand) is repeatedly shifted until its first (least significant) integer digit containing the decimal point bit $B4$="1," reaches the first decimal denomination C1 of the register M;
status P14, wherein the number stored in the register N (multiplier) is repeatedly shifted (one digit period for each memory cycle) until its most significant digit reaches the first decimal denomination C1 of the register N;
status P9 (lasting one memory cycle) wherein the two numbers to be multiplied are examined as to sign agreement, while the contents of the register N (multiplier) is transferred into the register R for allowing the register N to subsequently accumulate the product;
status P40 (lasting one memory cycle) wherein the two operands are examined to determine which is the greatest one (this has no relevance when multiplying, but instead when dividing);
status P10 (lasting one memory cycle) wherein the digit of the multiplier which is stored in the decimal denomination occupied by the decimal point of the multiplicand is diminished one unit, while the multiplier itself is delayed (that is shifted toward the most significant denomination) on digit period;
status P50 (lasting one memory cycle), wherein the multiplicand M is added to the number stored in the accumulator N;
status P60 (lasting one memory cycle), wherein the radix correction of the sum obtained in the preceding status is performed.

From this status P60 the machine reverts into the status P40 for repeating the partial sequence P40, P10, P50, P60, which partial sequence is repeated $n$ times if $n$ is the most significant decimal digit of the multiplier. It is to be noted that the numbers stored in the registers R, N and M are delayed one digit period, that is shifted one decimal denomination toward the most significant denomination, in the statuses P10, P50 and P60 respectively, whereby after each one of said partial sequences P40, P10, P50, P60 said three numbers are restored into their previous alignment. After the $n$th of said partial sequences, in order to shift the multiplier (register R) and the partial product (register N) one decimal denomination toward the most significant denominations, a reduced partial sequence comprising the statuses P40, P10, P50 is executed. In the status P50 of this reduced partial sequence, contrary to the normal operation of the computer in the status P50, the switching network 36 does not connect the register M to the adder 72, whereby the number N is shifted without being altered.

Thereafter $m$ partial sequences P40, P10, P50, P60 are executed as previously explained, if $m$ is the second most significant digit of the multiplier, and so on.

By examining in more details the operation of the computer, it is to be noted that in the status P9 the multiplier is transferred from the register N to the register R via a binary inverter, whereby each decimal digit of the multiplier itself is complemented to 15.

In the status P10 the switching network 36 connects the output LR of the register R to the input 1 of the adder 72, whose output is connected to the input 13 of the register K, whose output 14 in turn is connected to the input SR of the register R so as to build up a closed loop. As the second input 2 of the adder 72 does receive no signal, the contents of the register R recirculates in said loop without being altered and is therefore delayed one digit period in each memory cycle. Moreover, under these conditions said loop is adapted to act as a counter in the way previously explained in the general description, in order to count the adding cycles performed for each digit of the multiplier. More particularly it will be remembered that for having said loop to act as a counter, it is necessary to feed the binary-carry storing bistable device A5 with a counting pulse (that is, to simulate a binary carry) in the bit period in which the minimum-weight bit contained in the counter is fed into the adder. In the present case this bit will be the bit B5 of that decimal digit of the multiplier which is now to be modified by means of the counting pulses. In the present case, when reading the decimal point bit $B4$="1" of the register M, the bistable device A5 is energized to simulate said binary carry, which carry will be fed to the adder 72 concurrently with the first bit B5 of that digit of the multiplier which, having been complemented to 15, is now processed. Therefore the last mentioned digit will be increased one unit during each partial sequence of statuses P40, P10, P50, P60 as well as during each reduced partial sequence of statuses P40, P10, P50.

Therefore, if $n$ is the digit of the multiplier now considered, after $n$ partial sequences P40, P10, P50, P60 said digit of the multipler will become 15. In the meantime, the computer begins to repeat once more said partial sequence, whereby in the status P10 said digit of the multiplier becomes 16, thus producing a final binary carry R8 coming out from the last bit period T8 of said digit of the multiplier. This carry energizes the bistable device A6, which during the following status P50 will affect both the switching network 36 for preventing the register M from being connected to the adder and the logic circuit 27 for causing said status P50 to be followed by status P40 instead of status P60, whereby the partial sequence of statuses the computer goes through in this case will be the reduced sequence P40, P10, P50 in which the partial product produced in the register N is not altered and the partial product itself along with the multiplier are shifted. Immediately after said binary carry R8 has been produced, the bistable device A5 will be de-energized by the clock pulse T2 so as to clear out said carry stored therein, for preventing said carry from being unduly transmitted to the other denominations of the multiplier, because said other denominations must not be modified in this phase of the multiplication.

It is to be noted that, due to the shifting of the multiplier R during said reduced partial sequence P40, P10, P50, the digit of the multiplier next following the digit just considered is shifted into the denomination corresponding to that denomination of the register M which contains the decimal point of the multiplicand and that said relative alignment of the multiplier with respect to the multiplicand will remain unchanged throughout the following partial sequences P40, P10, P50, P60 until also the partial product of said next following digit and the multiplicand will be computed and accumulated, whereby the decimal point bit $B4$="1" of the multiplicand M acts as a mark for identifying the digit of the multiplier R which is now to be considered.

From the foregoing it is further apparent that the reduced partial sequence P40, P10, P50 executed after completion of the computation of the partial product relating to the last (least significant) digit of the multiplier R will cause said last digit to be shifted one denomination beyond the decimal point of the multiplicand M. Therefore, in the following status P40, during the digit period wherein the decimal point bit B4 of the register M is read out of the memory LDR, no digit-indicating bit $B2$="1" will be concurrently read out in the register R. Upon occurrence of this circumstance the bistable device A9 will be energized by the reading signal produced by reading out said decimal point bit, whereby the bistable device A9 will affect the logic circuit 27 so as to prevent it from determine as the next following status the status P10. Thus the multiply operation ends. Said next following status will be either the status P17 (extract the next instruction) if the computer is preset for automatic operaion or the status P18 (first status of a sequence P18, P19, P22 wherein the multiplicand Y is printed out) if the computer is preset for manual operation.

In a similar way the division is performed according to the repeated subtraction method.

What we claim is:

1. An electronic computer comprising:

(a) sequence control means defining a first and a subsequent second status, (b) a plurality of cyclic serial registers each one having a plurality of successive decimal denominations each one including a plurality of successive binary denominations, and having an output line for serially delivering the successive bits of its successive binary denominations, corresponding bits of the several registers being delivered substantially in parallel, and at least one of said registers having an additional binary denomination in each decimal denomination, (c) a single binary adder fed, in said first status, by the output lines of two of said registers for producing an uncorrected sum digit for each pair of corresponding decimal digits delivered on said two output lines, (d) means controlled by said adder for indicating the magnitude of said uncorrected sum digit, (e) means fed by said adder for storing said uncorrected sum digit in a decimal denomination of one of said registers, (f) means responsive to said indicating means for storing in the additional binary denomination of the last mentioned decimal denomination a tag bit having a value depending on said magnitude, (g) a filler digit generator responsive, in said second status, to said tag bit being delivered on the corresponding output line for generating a different filler digit according to the value of said tag bit, (h) said adder being fed, in said second status, by said filler digit generator and by the last mentioned register.

2. An electronic computer comprising:

(a) a cyclic serial memory for storing two multi-digit binary-coded decimal numbers, (b) means effective during a first memory cycle for adding together the successive pairs of corresponding digits of said two numbers to obtain successive uncorrected sum digits, (c) means controlled by said adding means for indicating the magnitude of each one of said uncorrected sum digits, (d) means for storing said uncorrected sum digits in said memory, (e) means controlled by said indicating means for storing in said memory, for each of said uncorrected sum digit, a mark having a value depending on whether the corresponding magnitude exceeds nine or not, (f) means effective during a second memory cycle for sequentially reading out of said memory said uncorrected sum digits along with the relevant marks.

(g) and means responsive to said reading means for adding to each uncorrected sum digit being read out a filler digit having a value depending on the value of the relevant mark.

References Cited by the Examiner

UNITED STATES PATENTS

| | | | |
|---|---|---|---|
| 2,981,471 | 4/1961 | Eachus | 235—175 |
| 2,989,237 | 6/1961 | Duke | 235—169 |
| 2,991,009 | 7/1961 | Edwards | 235—169 |
| 3,089,644 | 5/1963 | Wensley | 235—169 |

MALCOLM A. MORRISON, *Primary Examiner.*

M. J. SPIVAK, *Assistant Examiner.*